(12) United States Patent
Kanigicherla et al.

(10) Patent No.: US 9,086,843 B2
(45) Date of Patent: Jul. 21, 2015

(54) AUDIO CONTROLLER

(75) Inventors: Balaji Kanigicherla, Hyderabad (IN); Siva Raghuram Voleti, Hyderabad (IN); Manohar Kotta, Hyderabad (IN); Murthy Dhulipala, Hyderabad (IN); Suman Kopparapu, Hyderabad (IN)

(73) Assignee: INEDA SYSTEMS PVT. LTD., Hyderabad (IN)

( * ) Notice: Subject to any disclaimer, the term of this patent is extended or adjusted under 35 U.S.C. 154(b) by 163 days.

(21) Appl. No.: 14/111,071

(22) PCT Filed: Apr. 10, 2012

(86) PCT No.: PCT/IN2012/000258
§ 371 (c)(1),
(2), (4) Date: Oct. 10, 2013

(87) PCT Pub. No.: WO2012/140673
PCT Pub. Date: Oct. 18, 2012

(65) Prior Publication Data
US 2014/0044285 A1    Feb. 13, 2014

(30) Foreign Application Priority Data
Apr. 11, 2011    (IN) .......................... 1262/CHE/2011

(51) Int. Cl.
G06F 3/16    (2006.01)
(52) U.S. Cl.
CPC ................ *G06F 3/162* (2013.01); *G06F 3/165* (2013.01)
(58) Field of Classification Search
None
See application file for complete search history.

(56) References Cited

U.S. PATENT DOCUMENTS

| | | |
|---|---|---|
| 6,658,575 B1 | 12/2003 | Mizobuchi |
| 6,675,233 B1 | 1/2004 | Du et al. |
| 6,954,804 B2 | 10/2005 | Lam et al. |
| 7,444,439 B2 | 10/2008 | Du et al. |
| 7,702,403 B1 | 4/2010 | Gladwin et al. |
| 7,962,668 B2 | 6/2011 | Ding |
| 2004/0024931 A1 | 2/2004 | Lam et al. |
| 2006/0101175 A1 | 5/2006 | Du et al. |
| 2010/0161857 A1 | 6/2010 | Ding |
| 2010/0161865 A1 | 6/2010 | Xie et al. |

FOREIGN PATENT DOCUMENTS

| | | |
|---|---|---|
| CN | 1418334 | 5/2003 |
| CN | 101826063 | 9/2010 |
| JP | 2000-267697 | 9/2000 |
| TW | 201015887 | 4/2010 |

*Primary Examiner* — Paul Huber
(74) *Attorney, Agent, or Firm* — Workman Nydegger (57) ABSTRACT

Described herein is a multi-host computing system (100) having multiple host processors running different operating systems. In one implementation, a method of playing audio streams received from a plurality of hosts of a multi-host computing system (100), the method comprising receiving a second audio stream from a second host, and changing audio stream parameters associated with the second audio stream from second host to match the corresponding parameter values associated with a first audio stream received from a first host to generate an updated second audio stream. The method further comprises mixing the updated second audio stream with the first audio stream to generate a combined audio stream, and playing the combined audio stream using at least one audio codec (104) of the multi-host computing system (100).

14 Claims, 5 Drawing Sheets

AUDIO CONTROLLER

This application is a 371 of PCT/IN12/00258, filed Apr. 10, 2012.

FIELD OF INVENTION

The present subject matter, in general, relates to an audio controller and in particular to an audio controller for multi-host computing systems running multiple operating systems.

BACKGROUND

Computing systems, such as laptops, netbooks, workstations, and desktop computers typically include a central processing unit (CPU), also known as a host processor, running an operating system for carrying out various functionalities of the computing system. The host processor generally includes softwares, known as system drivers, such as audio drivers, video drivers, and wireless drivers for interacting with and controlling various peripheral devices connected to the computing systems for providing various functionalities of the computing systems. The peripheral devices include, for instance, audio controller for providing output of audio files playing in the computing system, microphone for recording audio files in the computing system, and modems for connecting to a network environment. For example, the audio driver is configured to control the audio controller for playing an audio file.

Further, the system drivers generally interact with the peripheral devices through hardware interfaces, known as device controllers provided in the computing systems for controlling the peripheral devices. For example, the computing systems include audio controllers and audio codecs for controlling the audio players connected to the computing systems.

Further, with advancement in computing technologies a single computing system may include two host processors having two separate operating systems. In order to reduce system costs and power consumption both the host processors are configured to share the same peripheral devices and device controllers. Sharing the same peripheral devices and device controllers, however, may not be possible in cases when both the host processors need to access the same peripheral device. A second host processor, which was not initially using a particular peripheral device, may thus need to wait for a first host processor, presently using the peripheral device, to release the peripheral device, thus effecting experience of a user using the second host processor.

SUMMARY

The present subject matter described herein relates to a multi-host computing system having multiple host processors running different operating systems. In one implementation, a method of playing audio streams received from a plurality of hosts of a multi-host computing system, the method comprising receiving a second audio stream from a second host, and changing audio stream parameters associated with the second audio stream from second host to match the corresponding parameter values associated with a first audio stream received from a first host to generate an updated second audio stream. The method further comprises mixing the updated second audio stream with the first audio stream to generate a combined audio stream, and playing the combined audio stream using at least one audio codec of the multi-host computing system.

This summary is provided to introduce concepts related to audio controller for multi-host computing systems running multiple operating systems which are further described below in the detailed description. This summary is not intended to identify essential features of the present subject matter nor is it intended for use in determining or limiting the scope of the present subject matter. These and other features, aspects, and advantages of the present subject matter will be better understood with reference to the following description.

BRIEF DESCRIPTION OF DRAWINGS

The above and other features, aspects and advantages of the subject matter will be better understood with regard to the following description and accompanying drawings, where.

DETAILED DESCRIPTION

The present subject matter relates to an audio controller for multi-host computing systems running multiple operating systems. In one implementation, the audio controller is a high definition (HD) audio controller configured to play high definition audio files.

Computing systems, such as laptops, netbooks, workstations, and desktop computers have nowadays become a source of entertainment for users. A user may use the computing systems for various entertainment purposes, such as to play music files and watch videos on the computing systems. The computing systems are generally connected to various communication devices such as modems; and audio devices, such as speakers, headsets, and microphones for playing and/or recording audio files on the computing systems.

Conventional computing systems typically include hardware interfaces, for example, audio controllers and audio codecs for controlling the audio devices connected to the computing systems. The hardware interfaces are typically connected to a central processing unit, also known as host processor, of the computing system. The host processor may be understood as the component of a computing system provided for carrying out the computing system's functions. The host processor generally includes softwares, known as system drivers, such as audio drivers and video drivers for interacting with and controlling the hardware interfaces and in turn the audio devices. The audio driver interacts with the hardware interfaces to provide operational commands to the hardware interfaces for playing an audio file, stored in the form of digital audio stream data in a system memory of the computing systems, using the audio devices.

In a conventional audio architecture, the audio controller connects to a set of audio codecs through an audio link. The audio controller may be understood as an I/O peripheral connected to the system memory, via peripheral component interconnect (PCI) or other peripheral attachment host interface, for storing in or fetching from the system memory, the audio stream data. The audio controller transfers these audio streams to the audio codecs, through the audio links, for rendering the audio streams as per audio specification of the computing system. The audio codecs convert the audio streams data into analog signals to be played by the audio devices.

The audio controller typically includes one or more direct memory access (DMA) engines for interacting with the system memory, audio codecs and the audio drivers. The audio controller typically includes a set of input and output stream DMAs, command output ring buffer (CORB) DMA, and response input ring buffer (RIRB) DMA. The output DMAs are configured to fetch the audio stream data from the system memory, one stream per DMA, and route it to the audio codec through the audio link. The Input DMAs are responsible for getting captured input audio data from the audio devices like microphone and saving it into the system memory. The CORB DMA is used to send control commands, received from the audio driver, to the audio codec for control purposes, such as audio codec initialization and setup. The RIRB DMA is used to receive responses, for example, acknowledgements of receiving commands from the audio codec and send them to the audio driver for further actions.

In operation, when a user wants to play an audio file, the user may select the audio file using an audio player application. Based on the selection, the audio driver will instruct the audio controller to fetch the audio stream data corresponding to the audio file from the system memory. The output DMA will then fetch the audio stream data from the system memory and send it to the audio codec through the audio link. Further, the audio driver will send control commands to the audio codec, through the CORB DMA, for initializing the audio codec to play the audio files. The control command may include, for example, GET commands for reading capabilities of the audio codec and set commands to configure the audio codec to play audio file data relating to memory location of the audio file that need to be played and audio stream parameters at which the audio file needs to be played. The audio stream parameters include, for example, audio stream sample rate and bit depth attributes of the audio file that needs to be played. The computing system may thus play the audio files using the audio controller and the audio codec.

Further, with advent of multi-host computing systems, multiple host processors running different operating systems can be included in the same computing system. Multi-host systems are generally configured to share same peripheral devices and resources in order to reduce system costs and power consumption. Thus, in present multi-host computing systems native audio controller and audio codecs configured to interact with one host are shared between multiple hosts. However, sharing the same audio devices, audio controller, and audio codecs may require software and hardware overhead. Further, sharing the audio devices, audio controller, and audio codecs may affect the experience of a user of the multi-host computing system. For instance, a user may not be able to play audio files using multiple host processors simultaneously as the audio controller may be controlled by a single host processor.

To this end, various embodiments of system architecture implementing a single audio controller for a multi-host computing system having multiple host processors running multiple operating systems are described. In one implementation, the audio controller is a high definition (HD) audio controller configured to play high definition audio files. Further, the system architecture can be implemented in a variety of computing systems. The multi-host computing system may include, but are not limited to, desktop computers, hand-held devices, laptops or other portable computers, mobile phones, personal digital assistants (PDA's), tablet personal computers, netbooks, workstations, and the like which utilize multiple processors on the same hardware platform. In one implementation, the system architecture can also be implemented for systems running any operating system such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art. The multi-host computing system is further connected to various audio devices, such as speakers, headsets, and microphones for playing and/or recording audio files on the multi-host computing system.

Multiple operating systems are typically used to perform different functions on the same hardware platform. Each operating system may provide a particular advantage over different operating system (OS). For example, in a multi-host computing system which may run two different operating systems, OS1 and OS2, the OS1 may provide better performance or support more applications than OS2 however, the OS2 may consume less resources such as memory, processing power, battery power when compared to OS1. In such a scenario, the computing system may implement OS1 for application processing and computational purposes whereas the computing system may implement OS2 during idle state.

In one implementation, the multi-host computing system includes the audio controller and one or more audio codecs connected to the audio controller through an audio link. The audio controller is connected to two host processors, host1 running a first operating system (OS1) and a host2 running a second operating system (OS2). Each of the host1 and host2 further include audio drivers, host1 audio driver and host2 audio driver, respectively for controlling the audio controller for playing/recording audio files on the multi-host computing system. Further, the audio controller is connected to system memories, host1 system memory and host2 system memory, of the host1 and host2, respectively. The audio controller is connected to the system memories for storing in or fetching, audio files, stored in the form of digital audio stream data in the system memories.

A first embodiment and a second embodiment describe system architecture implementing an audio controller for a situation when audio drivers of both the host processors, i.e., host1 and host2 are in active condition and simultaneously access the audio controller for playing audio files. On the other hand, a third and a fourth embodiment describe system architecture implementing an audio controller for a situation when the audio driver of only one of the host processors, i.e., either host1 or host2 is in active condition and accesses the audio controller for playing audio files.

According to the first embodiment, the audio controller includes two sets of dedicated output DMAs, a first set of DMAs, referred to as DMA1, for the host1 and a second set of DMAs, referred to as DMA2, for the host2 to enable simultaneous running of the audio drivers on both the host processors. The audio controller further includes two sets of CORB and RIRB DMAs, CORB DMA1 and RIRB DMA1 for host1 and CORB DMA2 and RIRB DMA2 for host2 to enable both the audio drivers to control the audio codecs. In one implementation, audio stream data from both the system memories are fetched, by the respective output DMAs, and combined such that both the audio stream data can be simultaneously transferred to a single audio codec over the audio link. For the purpose, the multi-host computing system includes a hardware mixer connected to the audio controller and a hardware sample rate converter (SRC) connected to the hardware mixer. The hardware SRC is configured to match the audio stream parameters of both the audio stream data, whereas the hardware mixer is configured to mix both the audio stream data after the sample rate conversion. A combined audio stream data may then be transferred to the audio codec for being played on the audio device.

Further, as both the audio stream data now have the same sample rate and bit depth, thus set commands from only a single audio driver may be used for initializing the audio codec to play the audio files. For example, if audio stream data corresponding to host1 was converted to match the audio stream parameters of the audio stream data corresponding to host2, then SET commands from the host2 audio driver will be sent to the audio codec, through a CORB DMA2, corresponding to the host2. Thus, audio files from both the host processors may be played simultaneously using a single audio controller without any software and hardware overheads.

According to the second embodiment, the audio controller includes two sets of dedicated output DMAs, DMA1 for host1 and DMA2 for host2 to enable simultaneous running of the audio drivers on both the host processors. The audio controller further includes two sets of CORB and RIRB DMAs, CORB DMA1 and RIRB DMA1 for host1 and CORB DMA2 and RIRB DMA2 for host2 to enable both the audio drivers to control the audio codecs. In one implementation, the hardware SRC of the first embodiment is replaced by a software SRC engine configured to match audio stream parameters of both the audio stream data. For the purpose, the software SRC engine may either convert one audio stream data to match the audio stream parameters of another audio stream data or restrict both the host processors to use the same stream parameters. The audio stream parameters may be shared by both the host processors using an audio sharing application and an inter-process communication link. In one implementation, the mixing of the audio streams may be done based on a stream ID associated with each of the audio streams in a hardware mixer. In one example the stream ID may be 4-bit tag or label sent by the audio controller at the beginning of each audio stream packet. A audio codec converter may b configured to output only the audio stream coming with the stream ID that it has been programmed for. Hence the audio driver running on the second host which is following first host's stream parameters with the help of SRC engine will set the stream ID to match that of host1 when it is targeted at same audio device. The audio stream data is then combined by the hardware mixer such that both the audio stream data can be simultaneously transferred to a single audio codec over the audio link as explained in description of the first embodiment. In the case where host2 does not target the same audio device or converter within the codec, it shall use a different stream ID and hence no stream mixing happens at the hardware mixer. The controller shall transfer streams of both the hosts as two independent streams over the audio link simultaneously. Round-robin arbitration may be used to interleave the commands from both hosts and send to audio codec. There may be no masking of commands using virtual audio codec except for codec reset and power down commands as one host driver will always follow the other host active audio stream attributes when it targets the same audio converter within the audio codec. Masking of conflicting audio controller settings may be taken care of by the audio controller. For example audio link reset from one host shall not affect the audio link if the other host controller is active and the audio link is up.

According to the third embodiment, the audio controller includes a single set of output DMAs, CORB DMAs, and RIRB DMAs. In one implementation, audio driver of only one host processor, say the host1 is active and playing a first audio file using the audio controller and the audio codecs. When the second host, i.e., the host2 wants to play a second audio file, the host2 audio driver will interact with the host1 audio driver through an audio sharing application to communicate the audio stream parameters of the second audio file to the host1 audio driver. The host2 audio driver will further communicate stream memory buffer attributes, such as start address, end address, and size of audio buffers in the memory. The audio stream data for both the audio files may then be fetched from the respective system memories. Further, audio stream parameters of the second audio files may be converted to match the audio stream parameters of the first audio file by, for example, a hardware SRC connected to the audio controller. The audio stream data of both the audio files is then combined by a hardware mixer connected to the audio controller. A combined audio stream data may then be transferred to the audio codec for being played on the audio device.

According to the fourth embodiment, the audio controller includes a single set of output DMAs, CORB DMAs, and RIRB DMAs. Further, only one audio driver, say host1 audio driver is active and controlling the audio controller to play a first audio file using the audio controller and the audio codecs. In one implementation, the audio controller is configured to enable two output DMAs to fetch audio stream data from both the system memories simultaneously and transfer the audio stream data to the same audio codec. The active audio driver, i.e., the host1 audio driver will then configure the audio codec to receive both the audio stream data in parallel and mix both the audio stream data into a single audio stream data to be played on the audio device.

The present subject matter thus provides various embodiments for a multi-host computing system having a single audio controller to simultaneously play audio files from two or more different host processors running their own operating systems.

Although the present subject matter has been described in relation to two host processors, it will be understood that the system architecture may be implemented for two or more host processors.

Figure 1:
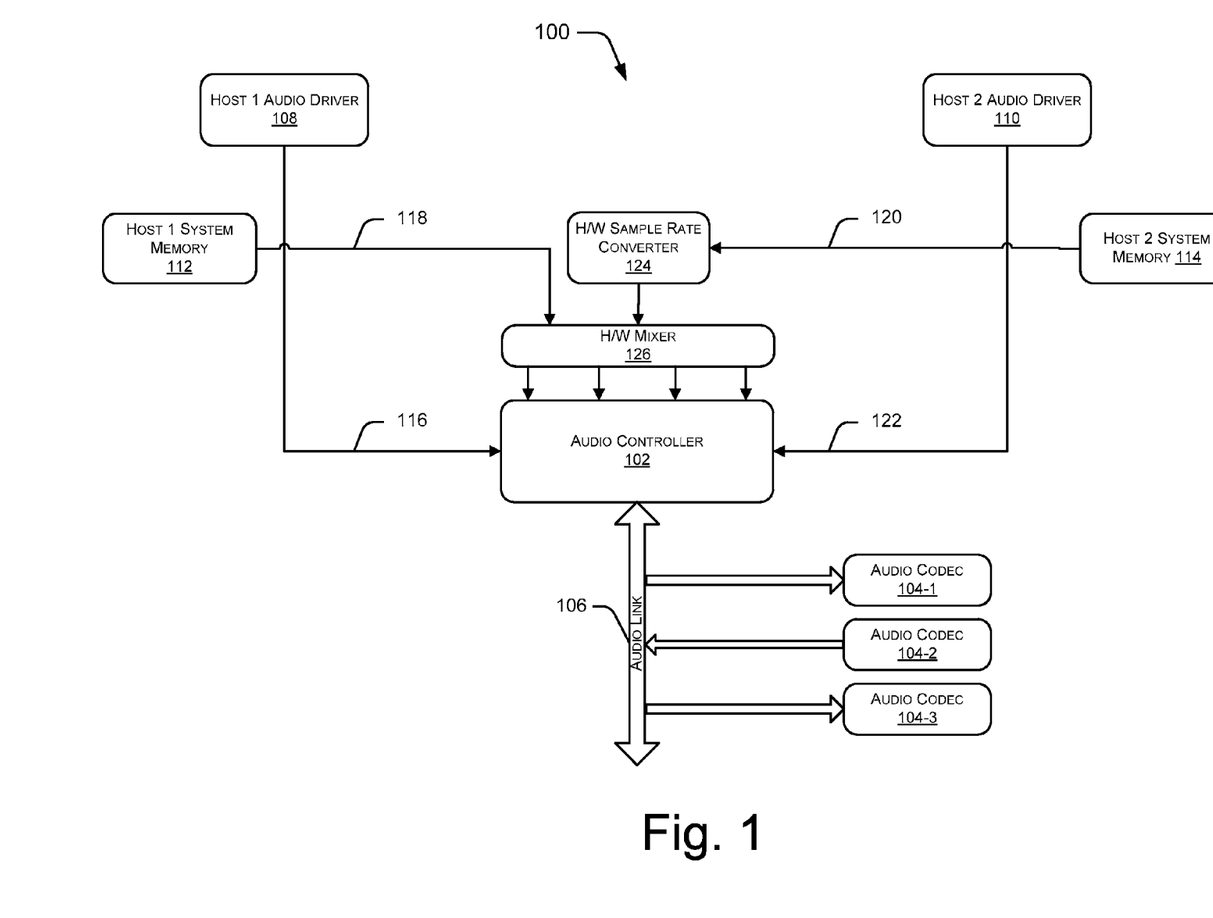
FIG. 1 illustrates system architecture for implementing an exemplary audio controller in a multi-host computing system, according to a first embodiment of the present subject matter.

FIG. 1 illustrates system architecture for implementing an exemplary audio controller in a multi-host computing system 100, according to a first embodiment of the present subject matter. Examples of the multi-host computing system 100 include, but are not limited to, computing device, such as mainframe computers, workstations, personal computers, desktop computers, minicomputers, servers, multiprocessor systems, and laptops; cellular communicating devices, such as a personal digital assistant, a smart phone, and a mobile phone; and the like. The multi-host computing system 100, hereinafter referred to as the system 100, is connected to various audio devices, such as speakers, headsets, and microphones for playing and/or recording audio files.

In one implementation, the system 100 includes two host processors, host1 (not shown in the figure) running a first operating system (OS1) and a host2 (not shown in the figure) running a second operating system (OS2). The system 100 further includes an audio controller 102 connected to one or more audio codecs 104-1, 104-2, and 104-3, hereinafter referred to as audio codec(s) through an audio link 106. The audio controller 102 is configured to play/record audio files of one or more host processors implemented in the system 100. In one implementation, the audio controller 102 is a high definition (HD) audio controller configured to play high definition audio files. The audio link 106 is configured to transfer audio stream data related to the audio files from the audio controller 102 to the audio codec 104. The audio codec 104 converts the audio streams data into analog signals to be played by the audio devices.

Each of the host1 and host2 include audio drivers, a host1 audio driver 108 and a host2 audio driver 110, respectively, to control the audio controller 102 for playing/recording audio files on the system 100. The system 100 further includes system memories, a host1 system memory 112 and a host2 system memory 114, for storing data, such as audio files related to the host1 and host2, respectively. The audio controller 102 is connected to each of the system memories (112, 114) via peripheral component interconnect (PCI) or other peripheral attachment for storing in or fetching audio files from the system memories (112, 114). Further, the audio stored in the form of digital audio stream data in the system memories (112, 114). Alternately, the host processors may share a common system memory for saving their data.

In one implementation, the audio controller 102 includes two sets of dedicated output DMAs (not shown in the figure), a first set of DMAs, referred to as DMA1, for the host1 and a second set of DMAs, referred to as DMA2, to enable simultaneous running of the audio drivers (108, 110) on the host processors, host1 and host2. The DMA1 and the DMA2 may include, for instance, n number of DMAs, with n ranging in between 1 to 15. The audio controller 102 further includes two sets of CORB and RIRB DMAs (not shown in the figure), CORB DMA1 and RIRB DMA1 for host1 and CORB DMA2 and RIRB DMA2 for host2 to enable both the audio drivers to control the audio codecs. Functioning of the CORB DMAs and RIRB DMAs will be explained in more details in explanation of FIG. 2. Further, the system 100 is configured to implement the audio controller 102 for a situation when audio drivers (108, 110) of both the host processors, i.e., host1 and host2 are in active condition and simultaneously accessing the audio controller 102 for playing audio files.

In operation, when a user wants to play an audio file, say file1 on the host1, the user may select the file1 using an audio player applications running on the OS1. Based on the selection, the host1 audio driver 108 will instruct the audio controller 102 to fetch audio stream data corresponding to the file1 from the host1 system memory 112. In one implementation, the host1 audio driver 108 will send control command 116 to the audio controller 102. The control command 116 may include, for example, GET commands for reading capabilities of the audio codec 104 and SET commands to configure the audio codec 104 to play audio files. The audio stream parameters include, for example, audio stream sample rate and bit depth attributes of the audio file that needs to be played. Based on the control command 116, the DMA1 will fetch audio stream data 118 corresponding to the file1 from the host1 system memory 112. The audio stream data 118 will then be transferred to the audio codec 104-1 for being played on the audio device.

Further, when the user wants to play another audio file, say file2 on the host2, the user may select the file2 using an audio player applications running on the OS2. Based on the selection, the host2 audio driver 110 will instruct the audio controller 102, by sending control commands 120, to fetch audio stream data corresponding to the file2 from the host2 system memory 114. Based on the control command 120, the DMA2 will fetch audio stream data 122 corresponding to the file2 from the host2 system memory 114. In one implementation, the audio stream data 122 is first provided to a Hardware (H/W) sample rate converter (SRC) 124. The H/W SRC 124 is configured to match the audio stream parameters of both the audio stream data (118, 120). For the purpose, the H/W SRC 124 may access the control command 116 to obtain the sample rate and bit depth of the audio stream data 118. The H/W SRC 124 then converts the sample rate and bit depth of the audio stream data 120 to generate an updated audio stream data having the sample rate and bit depth similar to that of the audio stream data 118. In one implementation, H/W SRC 124 may be any sample rate converter known in the art.

The updated audio stream data is then provided to an H/W mixer 126 connected to the H/W SRC 124 and the audio controller. The H/W mixer 126 is configured to combine the updated audio stream data and the audio stream data 118 to obtain a combined audio stream data. The combined audio stream data may then be transferred to the audio codec 104-1 through the audio link for being played on the audio device. Combining both audio stream data into a single audio stream data enables the audio codec 104 to play audio files from the host processors, host1 and host2 simultaneously.

Further, as both the audio stream data now have the same sample rate and bit depth, thus control commands from only a single audio driver may be used for initializing the audio codec 104 to play the audio files, as will be explained in more details in explanation of FIG. 2. Thus, audio files from both the host processors may be played simultaneously using a single audio controller without any software and hardware overheads. The system 100 is thus configured to implement the audio controller 102 for a situation when audio drivers (108, 110) of both the host processors, i.e., host1 and host2 are in active condition and simultaneously accessing the audio controller 102 for playing audio files.

Figure 2:
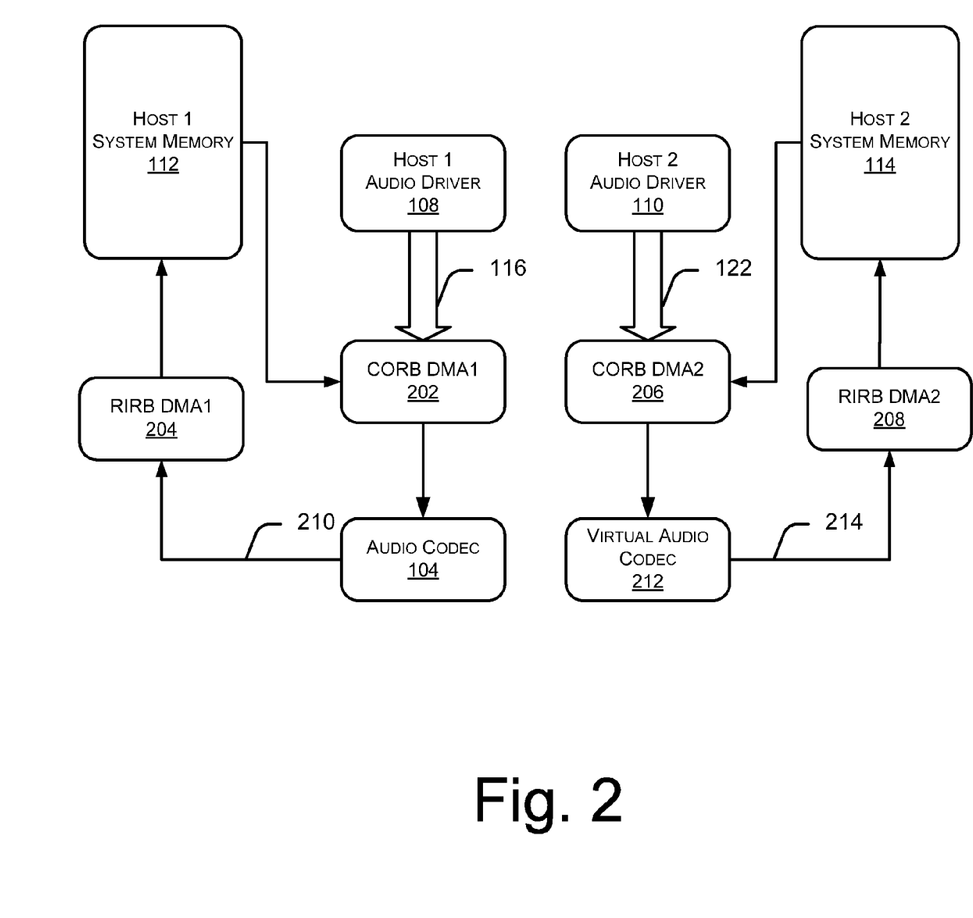
FIG. 2 illustrates a command flow diagram for the exemplary audio controller for multi-host computing system, according to the first embodiment of the present subject matter.

FIG. 2 illustrates a command flow diagram of the audio controller 102, detailing interaction between the audio drivers (108, 110), the audio controller 102, and the audio codecs 104, according to a first embodiment of the present subject matter. As described in the description of FIG. 1, the audio controller 102 includes two sets of CORB and RIRB DMAs to enable both the audio drivers (108, 110) to control the audio codecs 104. In one implementation, the audio controller includes CORB DMA1 202 and RIRB DMA1 204 for the host1 and CORB DMA2 206 and RIRB DMA2 208 for the host2. The CORB DMA1 202 and the CORB DMA2 206 are configured to receive the control commands (116, 122) from the audio drivers (108, 110), respectively, and transfer the control commands (116, 122) to the audio codec 104. Similarly, the RIRB DMA1 204 and the RIRB DMA2 208 are configured to receive responses 210, to the control commands (116, 122), from the audio codec 104 and transfer the response 210 to the audio drivers (108, 110). Responses 210 may include, for example, an acknowledgement of receiving the control commands (116, 122).

In operation, when the user wants to play files from both the host1 and host2, control commands (116, 122) will be transmitted from the audio drivers (108, 110) to the CORB DMAs (202, 206), respectively. Although both the CORB DMAs (202, 206) shall be active, i.e., receive the control commands (116, 122) from the audio drivers (108, 110), however SET commands from only one of the audio drivers (108, 110) will be routed to the audio codec 104. On the other hand, GET commands from both the audio drivers (108, 110) will be routed to the audio codec 104. In one implementation, the SET commands of that audio driver (108, 110) is routed which was initially playing the audio file using the audio codec 104 and had thus configured the audio codec 104 for playing audio stream data at a particular configuration. For instance, in the description of FIG. 1, host1 was initially using the audio codec 104 to play the audio stream data 118, whereas the audio stream data 120 from the host2 was selected later for being played. Thus, control command 116 from the host1 will be received by the CORB DMA2 206 and routed to the audio codec 104 to play the combined audio stream.

On the other hand, the control commands 122 from the host2 will be received by the CORB DMA2 206. The CORB DMA2 206 will then route the SET commands from the control commands 122 to a virtual audio codec 212 and the GET commands from the control commands 122 to the audio codec 104. In one implementation, the virtual audio codec 212 is a replica of the audio codec 104 and is configured to interact with a host processor whose functions are being performed by another host processor. The virtual audio codec 212 is thus implemented to give a host processor the impression of having a dedicated audio codec for playing its audio files. The virtual audio codec 212 thus receives the control command 122 from the CORB DMA 206 and interprets the control command 122 to check for any solicited commands expecting solicited responses. A solicited command may be understood as the command for which an audio codec needs to send a response, say an acknowledgment message. The virtual audio codec 212 is thus configured to send a dummy response 214 in response to all solicited commands where response is expected from the audio codec 104 to emulate actual response behavior of the audio codec 104. Emulating actual response behavior of the audio codec 104 helps the virtual audio codec 212 in giving the host2 the impression of having control over the audio codec 104 for playing its audio files. Further, as the virtual audio codec 212 is used to send only dummy responses 214 to the host2, the virtual audio codec 212 thus not need to interact with the audio codec 104 or any other part of the system 102.

Although the present subject matter has been described in relation to two host processors, it will be understood that the system architecture may be implemented for two or more host processors.

Figure 3:
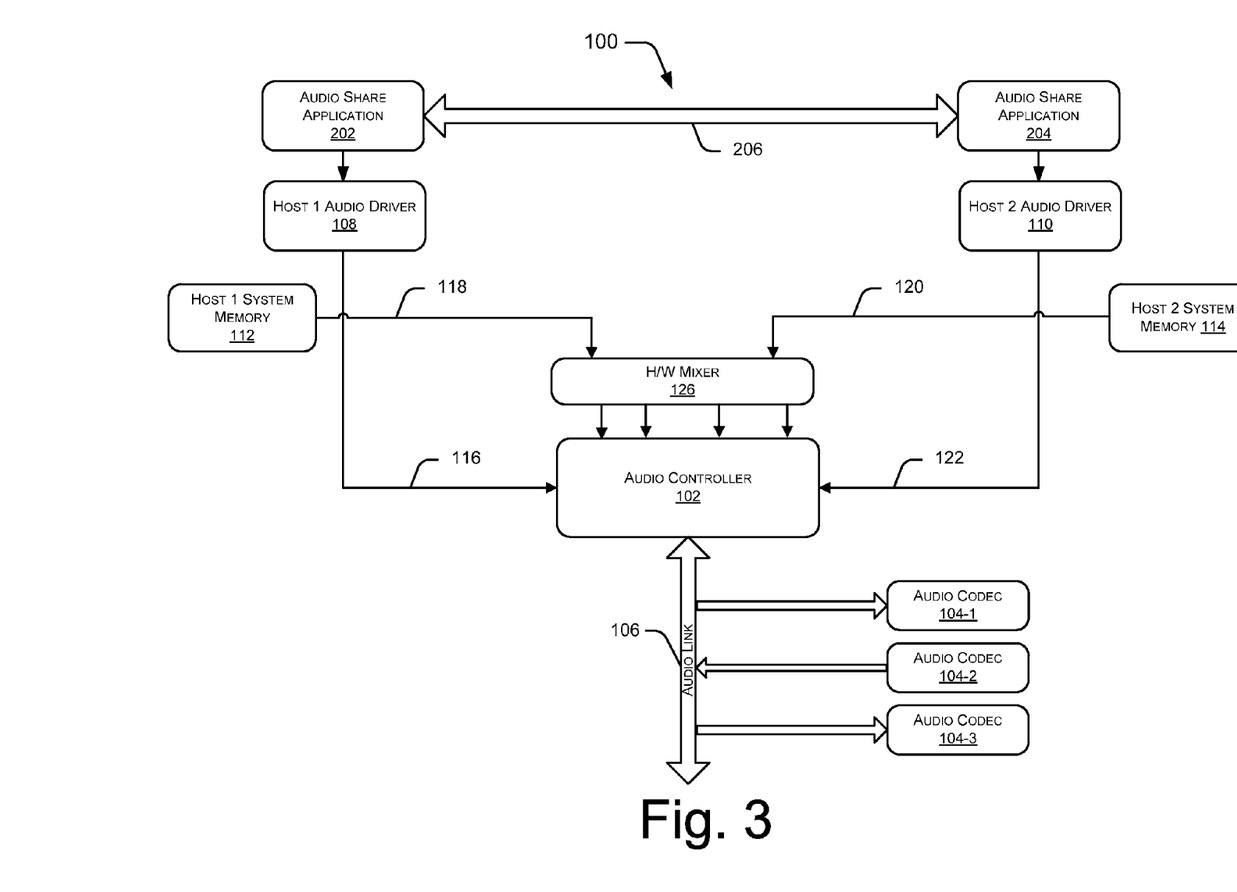
FIG. 3 illustrates system architecture for implementing an exemplary audio controller in a multi-host computing system, according to a second embodiment of the present subject matter.

FIG. 3 illustrates system architecture for implementing the audio controller 102 in the multi-host computing system 100, according to a second embodiment of the present subject matter.

As described in the description of FIG. 1 and FIG. 2, the system 100, includes two host processors, the host1 running OS1 and the host2 running the OS2. The system 100 further includes the audio controller 102, the audio codec(s) 104, the audio link 106, the host1 system memory, 112 and the host2 system memory 114. Further, each of the host1 and host2 include audio drivers, a host1 audio driver 108 and a host2 audio driver 110, respectively, to control the audio controller 102 for playing/recording audio files on the system 100.

As previously explained, the audio controller is configured to simultaneously play audio files of both the host processors, i.e., the host1 and the host2. For the purpose, the H/W mixer 126 of the system is configured to combine audio stream data (118, 120) corresponding to both the audio files to obtain a combined audio stream data that can be played by a single audio codec 104. However, in order to combine both the audio stream data (118, 120) the audio stream parameters of both the audio stream data (118, 120) need to be matched. For the purpose, the system 100 includes a software SRC engine (not shown in the figure) configured to match audio stream parameters of both the audio stream data (118, 120). In one implementation, both the host1 and the host2 will include separate software SRC engines.

In one embodiment, the software SRC engine is configured to convert audio stream parameters of one audio stream data, say, the audio stream data 120 to match the audio stream parameters of the audio stream data 118. The software SRC engine may access the audio stream parameters of both the audio stream data (118, 120) to perform the conversion. In one implementation, the system 100 includes audio sharing application, for example, a first audio sharing application 202 connected to the host1 audio driver 108 and a second audio sharing application 204 connected to the host2 audio driver 110, for sharing the audio stream parameters of both the host processors. The audio share applications (202, 204) enable audio drivers of both the host processors to access the other host processor to share data, for example, the audio stream parameters. The system 100 further includes an inter-process communication (IPC) link 206 to enable the audio share applications (202, 204) to share the audio stream parameters of both the host processors. Based on the shared audio parameters, the SRC engine may convert the audio stream parameters of the audio stream data 120 to generate an updated audio stream data having the sample rate and bit depth similar to that of the audio stream data 118.

In another embodiment, both the host processors may be configured to use the same audio stream parameters for the audio stream data (118, 120). In order to use the same parameters, one of the host processors, say, the host1 may share the audio stream parameter with the host2 using the audio sharing applications (202, 204). Based on the shared audio stream parameters the host2 audio driver 110 may provide the audio stream data 120 having the audio stream parameters similar to the audio stream data 118. The audio stream data (118, 120) is then combined by the H/W mixer 126 such that both the audio stream data can be simultaneously transferred to a single audio codec 104 as explained in description of the FIG. 1 and FIG. 2. There shall be no masking of host2 SET commands using virtual codec except for codec reset and power down commands as one host driver will always follow the other host active stream attributes when it targets the same audio converter within the codec.

The system 100 is thus configured to implement the audio controller 102 for a situation when audio drivers (108, 110) of both the host processors, i.e., host1 and host2 are in active condition and simultaneously accessing the audio controller 102 for playing audio files. Further, audio files from both the host processors may be played simultaneously using a single audio controller without any hardware overheads.

Figure 4:
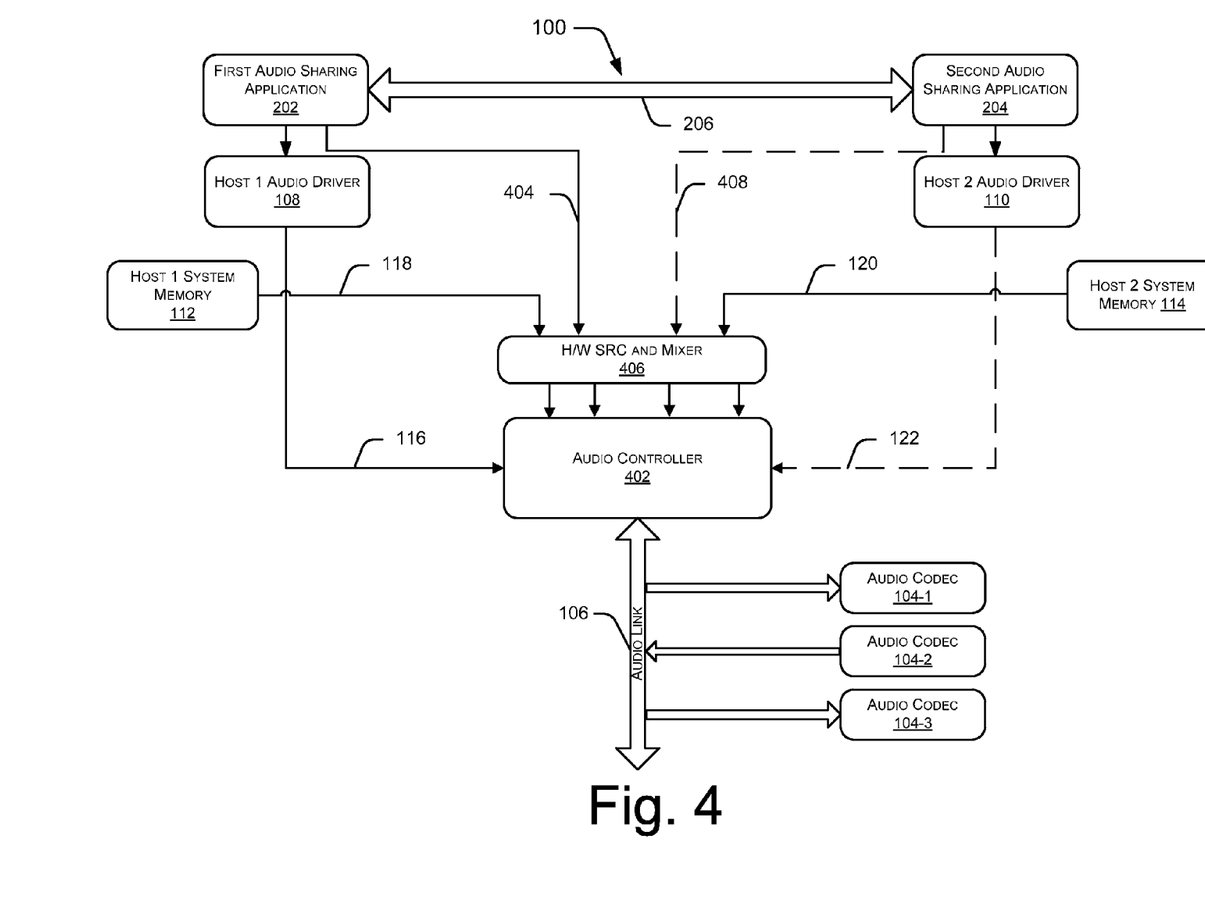
FIG. 4 illustrates system architecture for implementing an exemplary audio controller in a multi-host computing system, according to a third embodiment of the present subject matter.

FIG. 4 illustrates system architecture for implementing an exemplary audio controller in the multi-host computing system 100, according to a third embodiment of the present subject matter.

As described in the description of FIG. 2, the system 100, includes two host processors, the host1 running OS1 and the host2 running the OS2. The system 100 further includes an audio controller 402, the audio codec(s) 104, the audio link 106, the host1 system memory, 112 and the host2 system memory 114. Further, the host1 and the host2 include the host1 audio driver 108 and the host2 audio driver 110, respectively, to control the audio controller 102 for playing/recording audio files on the system 100. The system 100 further includes the first audio sharing application 202 connected to the host1 audio driver 108 and the second audio sharing application 204 connected to the host2 audio driver 110, for sharing audio stream parameters of audio files being played by both the host processors. As previously described, the audio share applications (202, 204) enable audio drivers of both the host processors to access the other host processor to share data, for example, the audio stream parameters. Further, the IPC link 206 is provided to enable the audio share applications (202, 204) to share the audio stream parameters of both the host processors.

In one implementation, the audio controller 402 is configured to simultaneously play audio files from both the host processors, i.e., the host1 and the host2 in a situation when the audio driver (108, 110) of only one of the host processors is in active condition and accesses the audio controller 402 for playing both the audio files. The audio controller 402 includes a single set of output DMAs, CORB DMAs, and RIRB DMAs for interacting with the audio drivers (108, 110), the system memories (112, 114), and the audio codecs 104. For the purpose of explanation and not as a limitation, initially the host1 audio driver 108 is active and playing a first audio file, say file1, using the audio controller 402 and the audio codecs 104. However, when the user wants to play a second audio file, say file2, using the host2, the host2 audio driver 110 will interact with the host1 audio driver 108 through the audio sharing applications (202, 204). The host2 audio driver 110 may then access the host1 to provide audio stream parameters at which the file2 needs to be played. Further, the host2 audio driver may also communicate stream memory buffer attributes to the host1 audio driver 108.

The first audio sharing application 202 of the active audio driver, i.e., host1 audio driver 108 will then provide an initialization command 404 to a H/W SRC and mixer 406 for fetching the audio stream data (118, 120) corresponding to the file1 and file2, respectively, from the respective system memories (112, 114). The H/W SRC and mixer 406 is configured to convert the audio stream parameters of either of the audio stream data (118, 120) to match the audio stream parameters of the other audio stream data (118, 120). For example, the H/W SRC and mixer 406 may convert the audio stream parameters of the audio stream data 120 to match the audio stream parameters of the audio stream data 118. The H/W SRC and mixer 406 may then mix the audio stream data 118 and an updated audio stream data to generate a combined audio stream data. The combined audio stream data is then provided to the audio controller 402 which routes the combined audio stream data to the audio codecs 104. In one implementation, the host1 audio driver 108 configures the audio controller 402 and the audio codecs 104 to play the combined audio stream data on the audio device. In order to seamlessly play the file2, the second audio sharing application 204 of the host2 will regularly provide the stream memory buffer attributes to the to the first audio sharing application 204.

Further, when the host1 audio driver 108 switches off or goes into an inactive mode, the host2 audio driver 110 is provided a release command from the host1 audio driver 108. On receiving the release command, the host2 audio driver 110 starts controlling the audio controller 402. In such a case the second audio sharing application 204 of the host2 will start providing an initialization command 408 to the H/W SRC and mixer 406 for fetching the audio stream data (118, 120).

The system 100 is thus configured to implement the audio controller 402 for a situation when the audio driver (108, 110) of only one of the host processors is in active condition and accessing the audio controller 402 for playing both the audio files simultaneously.

Figure 5:
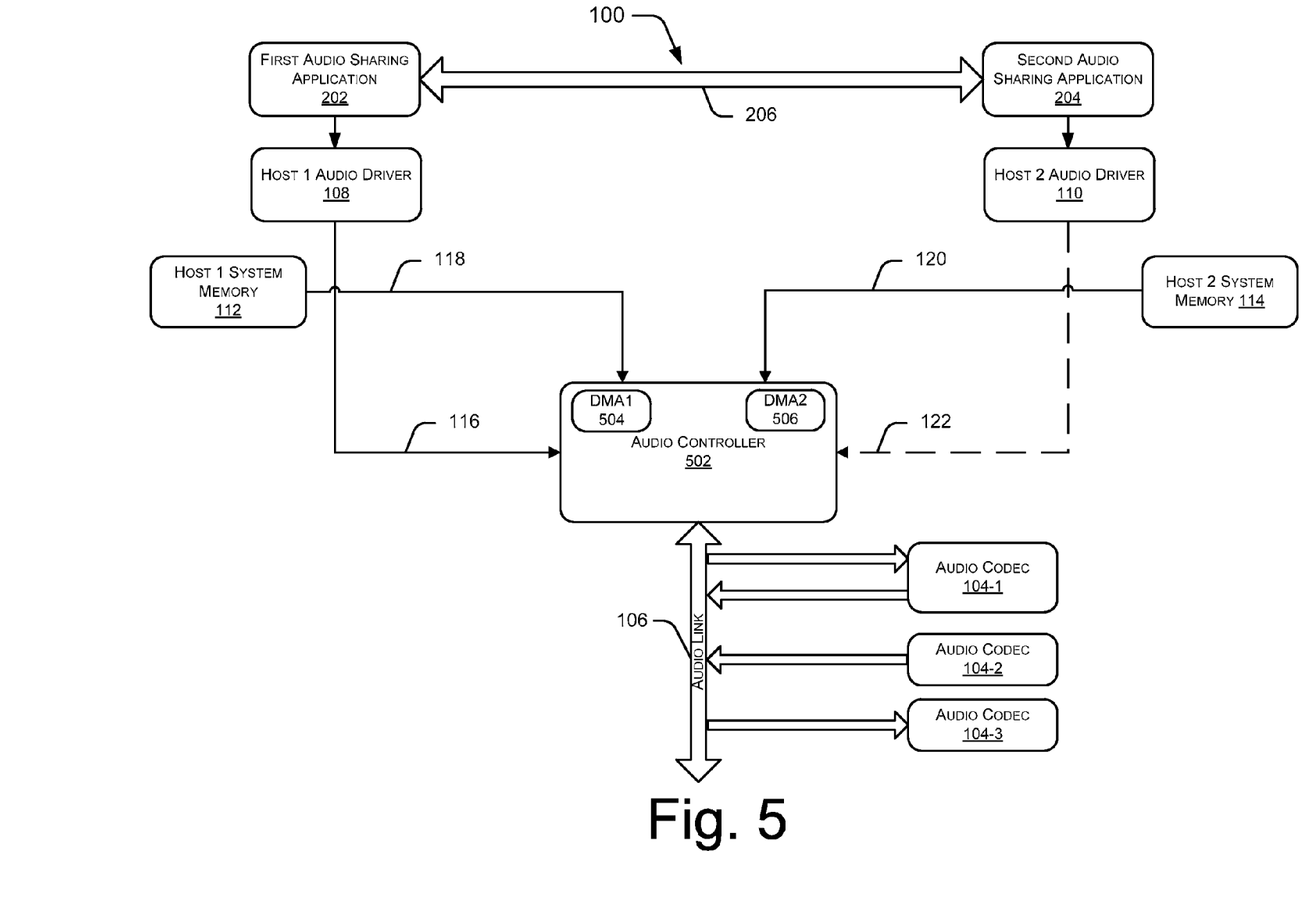
FIG. 5 illustrates system architecture for implementing an exemplary audio controller in a multi-host computing system, according to a fourth embodiment of the present subject matter.

FIG. 5 illustrates system architecture for implementing an exemplary audio controller in the multi-host computing system 100, according to a fourth embodiment of the present subject matter.

As described in the description of FIGS. 1, 2, and 3 the system 100, includes two host processors, the host1 running OS1 and the host2 running the OS2. The system 100 further includes an audio controller 502, the audio codec(s) 104, the audio link 106, the host1 system memory, 112, the host2 system memory 114, the host1 audio driver 108, the host2 audio driver 110, the first audio sharing application 202, and the second audio sharing application 204. Further, the IPC link 206 enables the audio share applications (202, 204) to share the audio stream parameters of both the host processors.

In one implementation, the audio controller 502 includes a single set of output DMAs, CORB DMAs, and RIRB DMAs. Further, the audio controller 502 is configured to simultaneously play audio files from both the host processors, i.e., the host1 an the host2 in a situation when the audio driver (108, 110) of only one of the host processors is in active condition and accesses the audio controller 502 for playing both the audio files.

As an illustration, the host1 audio driver 108 of the host1 is active and playing a first audio file, say file4, using the audio controller 502 and the audio codecs 104. Further, in order to play a second audio file, say file5, the host2 audio driver 110 will interact with the host1 audio driver 108 through the audio sharing applications (202, 204). The host1 audio driver 108 may then access the host2 to obtain the stream memory buffer attributes and the audio stream parameters at which the file2 needs to be played.

Further, the audio controller 502 is configured to enable two output DMAs, a DMA1 504 and a DMA2 506 to fetch audio stream data (118, 120) from both the system memories (112, 114) simultaneously. The audio stream data (118, 120) is then routed to the same audio codec 104. In one implementation the active audio driver, i.e., the host1 audio driver 108 is configured to send control command 508 to initialize the audio codec 104 to receive both the audio stream data (118, 120) in parallel. Further, the audio codec 104 is configured to combine both the audio stream data (118, 120) into a combined audio stream data to be played on the audio device.

The system 100 is thus configured to simultaneously play audio files from two different hosts processors without increasing the cost and power consumption of the system 100. Further, although the system 100 has been described as having two host processors, it should be appreciated that the present subject matter can be extended to systems having more than two host processors. These and other features and advantages of the system will be further describes in conjunction with the following figures and embodiments.

Additionally, although the system 100 has been described as being configured to play two audio files simultaneously, it should be appreciated that the present subject matter can be extended to playing an audio file from one host processor and simultaneously recording external audio input from, say, a microphone from the other host processor.

Although implementations of audio controller for multi-host computing systems have been described in language specific to structural features and/or methods, it is to be understood that the present subject matter is not necessarily limited to the specific features or methods described. Rather, the specific features and methods are disclosed as exemplary implementations of the audio controller.

We claim:
1. A multi-host computing system (100), comprising:
 a plurality of hosts, wherein each host runs an audio driver (108, 110);
 at least one audio codec (104) configured to play an audio stream received from the audio driver (108, 110) of each host of the plurality of hosts;

a high definition (HD) audio controller (102), communicatively coupled with the at least one audio codec (104) through an audio link (106), the HD audio controller (102) comprising at least one set of output Direct Memory Access (DMA) units and input DMA units for each host of the multi-host computing system (100), wherein each of the at least one set of output Direct Memory Access (DMA) units and input DMA units is configured to fetch data from a host memory (112, 114) of each of the plurality of hosts to enable simultaneous sharing of the HD audio controller (102) among the plurality of hosts; wherein the HD audio controller (102) is configured to:

initialize and enumerate the at least one audio codec (104) for each host of the plurality of hosts;

interleave audio codec commands received from the audio driver (108, 110) of at least one of the plurality of hosts, wherein the at least one of the plurality of hosts generates the audio codec commands for the at least one audio codec (104) based on the initialized and enumerated;

transmit the audio codec commands to the at least one audio codec (104) based in part on at least one of a sequential order and a using round-robin arbitration;

route solicited responses generated by the at least one audio codec (104) on receipt of the audio codec commands to the audio driver (108, 110) of at least one of the plurality of hosts generating the audio codec commands; and route unsolicited responses generated by the at least one audio codec (104) on receipt of the audio codec commands to the audio driver (108, 110) of each of the plurality of hosts.

2. The multi-host computing system (100) as claimed in claim 1, wherein the HD audio controller (102) is further configured to mask audio link reset operation initiated by at least one of the plurality of hosts on determining the audio link (106) to be in use by another host from amongst the plurality of hosts.

3. The multi-host computing system (100) as claimed in claim 1, wherein the HD audio controller (102) is further configured to mask at least one of audio codec power down command and a audio codec reset command received from at least one of the plurality of hosts on determining the at least one audio codec (104) to be in use by at least another host from amongst the plurality of hosts.

4. The multi-host computing system (100) as claimed in claim 1, wherein the multi-host computing system (100) further comprises:

a sample rate converter (124) configured to
convert audio stream parameters associated with a second audio stream (120) received from a second host of the plurality of hosts to match to values of the audio stream parameters associated with a first audio stream (118) received from a first host of the plurality of hosts to generate an updated second audio stream;

a mixer (126) configured to
mix the first audio stream (118) and the updated second audio stream to generate a combined audio steam;
transmit the combined audio steam to the at least one audio codec (104) for playing the combined audio steam.

5. The multi-host computing system (100), as claimed in claim 4, wherein the HD audio controller (102) is further configured to:

fetch the audio stream from the memory of each of the plurality of hosts;

determine playback capabilities of at least one audio codec (104); and configure the plurality of audio codec (104) to play the combined audio steam.

6. The multi-host computing system (100), as claimed in claim 1, wherein the HD audio controller (102) further comprises a set of configuration registers for each host, wherein the set of configuration registers is controlled by the audio driver (108, 110) of each of the plurality of hosts to set playback parameters associated with the at least one audio codec (104).

7. The multi-host computing system (100), as claimed in claim 1, wherein the set of input DMA units is configured to transmit inbound audio streams from at least one input audio device to each host of the multi-host computing system (100).

8. The multi-host computing system (100), as claimed in claim 1, wherein the audio controller (102) is configured to replicate at least one of a command output ring buffer (CORB) DMA unit, a response input ring buffer (RIRB) DMA unit, the at least one audio codec (104), and a set of output DMA buses for the each host of the multi-host computing system (100).

9. A method of playing audio streams received from a plurality of hosts of a multi-host computing system (100), the method comprising:

receiving a second audio stream from a second host;

changing audio stream parameters associated with the second audio stream from second host to match the corresponding parameter values associated with a first audio stream received from a first host to generate an updated second audio stream;

mixing the updated second audio stream with the first audio stream to generate a combined audio stream; and playing the combined audio stream using at least one audio codec (104) of the multi-host computing system (100).

10. The method as claimed in claim 9, wherein the method further comprises:

determining playback capabilities of the at least one audio codec (104); and generating a response by the at least one audio codec (104), wherein the response is sent to at least one of the first host, and the second host, based on the determining, and wherein the response is indicative of at least an acknowledgement of receipt of the combined audio stream to be played.

11. The method as claimed in claim 9, wherein the method further comprises determining the audio steam parameters associated with at least one of the first audio stream and the second audio stream, wherein audio steam parameters comprises audio stream sample rate, a bit depth, a bit rate, an associated compression technique, and number of channels.

12. The method as claimed in claim 9, wherein the method further comprises generating control commands, by a HD audio controller (102), to fetch the first audio stream from the first host and the second audio stream from the second host simultaneously.

13. The method as claimed in claim 9, wherein the method further comprises sharing the audio stream parameters associated with the audio stream generated by at least one of the plurality of hosts with another of the plurality of hosts.

14. The method as claimed in claim 9, wherein the method further comprises:

receiving a command to power down the first host;

determining whether the first host is controlling a HD audio controller (102) shared amongst the plurality of hosts of the multi-host system (100);

relinquishing the control of the HD audio controller (102) on determining the first host is controlling the HD audio controller (102); and assigning control of the HD audio controller (102) to the second host.

* * * * *